United States Patent [19]

Yaniv et al.

[11] Patent Number: 4,606,610

[45] Date of Patent: Aug. 19, 1986

[54] IMAGING SYSTEM USING TELLURIUM-BASED ENERGY SENSITIVE SHEET AND VARIABLE IMAGE DISPLAYING MEANS

[75] Inventors: Zvi Yaniv, Southfield; Vincent D. Cannella, Birmingham; Terry T. Yu, Mt. Clemens; Christopher Fulton, Royal Oak, all of Mich.

[73] Assignee: Energy Conversion Devices, Inc., Troy, Mich.

[21] Appl. No.: 606,696

[22] Filed: May 3, 1984

[51] Int. Cl.[4] .................... G02F 1/13

[52] U.S. Cl. .................... 350/331 R

[58] Field of Search .................... 350/331 R

[56] References Cited

U.S. PATENT DOCUMENTS

| | | | |
|---|---|---|---|
| 4,012,122 | 3/1977 | McVeigh | 350/331 R |
| 4,066,460 | 1/1978 | Chang et al. | 96/48 R |
| 4,097,142 | 6/1978 | Moutou et al. | 355/45 |
| 4,106,939 | 8/1978 | Chang et al. | 96/48 R |
| 4,110,794 | 8/1978 | Lester et al. | 350/331 R X |
| 4,142,896 | 3/1979 | Chang et al. | 96/48 HD |
| 4,297,022 | 10/1981 | Lester | 350/331 R X |
| 4,332,880 | 6/1982 | Izu et al. | 430/272 |
| 4,334,734 | 6/1982 | Hareng et al. | 350/331 R |
| 4,340,662 | 7/1982 | Ovshinsky et al. | 430/270 |
| 4,386,836 | 6/1983 | Aoki et al. | 350/331 R X |

OTHER PUBLICATIONS

R. Shaffer, "Laser Printers for Computers May Soon Dominate Industry", *The Wall Street Journal*, Mar. 16, 1984, p. 1.

*Primary Examiner*—John K. Corbin
*Assistant Examiner*—Richard F. Gallivan
*Attorney, Agent, or Firm*—Lawrence G. Norris; Robert S. Nolan; Richard O. Gray, Jr.

[57] ABSTRACT

A system is disclosed which includes a transmissive liquid crystal display of the type which may display a line of characters or symbols at a time, or which may display only a raster line in combination with an energy source and a controllable and transportable medium. The medium is exposed by energy from the source of energy passing through the liquid crystal display which acts as a mask for the source of energy. The liquid crystal display may be set by electrical signals manually generated such as by a keyboard or by signals automatically generated by use of other electronic equipment. In one alternate embodiment of the invention a large area two-dimensional liquid crystal display is used as a mask. In another embodiment of the invention a liquid crystal display is used as a mask for the purpose of exposing a photoconductive drum of the type used in xerography. A reflective liquid crystal display is disclosed in yet another embodiment of the invention.

40 Claims, 5 Drawing Figures

IMAGING SYSTEM USING TELLURIUM-BASED ENERGY SENSITIVE SHEET AND VARIABLE IMAGE DISPLAYING MEANS

FIELD OF THE INVENTION

The present invention generally relates to a system for creating images, such as letter characters, on a medium such as paper. The present invention more particularly relates to such a system which includes an electronically controlled image forming means, such as a liquid crystal display, to enable the formation of the images on a light sensitive medium. The invention further relates to such a system capable of making multiple copies of an image without the need for first forming an intermediate or original copy of the image.

BACKGROUND OF THE INVENTION

Various types of impact printers or impact mechanisms are known in the prior art to create images, such as letter characters, on paper. Impact printers while widely used exhibit certain deficiencies. For example, impact printers require inking. Typically, the inking is accomplished by an ink carrying ribbon which must be periodically replaced. The ribbon not only must be properly inserted into the printer but, in addition, represents an additional cost in operating the printer. Impact printers further are noisy and because they are electromechanical devices incorporating many moving parts, they are always subject to wear. The electro-mechanical nature of such printers also limits their operating speed as well. Further, because they are electrochemical in nature and have become fairly complex, they require periodic servicing to minimize break downs, are bulky and heavy, and as a result, are difficult to move. Such printers are therefore essentially not portable.

Xerographic systems are also known in the prior art for creating multiple copies of images, such as letter characters, on paper. Such systems rely heavily on complex optical systems and require an intermediate medium such as an original copy on which the images are recorded prior to the making of the multiple copies. Further, conventional xerographic machines include mechanical scanning systems which provide scanning movement of the original with the image formed thereon relative to a light source. These scanning systems are complex and subject to break down. As a result, they require periodic maintenance and service.

Laser based non-impact systems are also known in the prior art for forming images, such as letter characters on paper. They generally require complex electronics to precisely control the deflection of the laser. Further, such systems require adequate power to properly drive the laser as well as the related control circuitry. These systems are also rather expensive due to the cost of the laser and the control circuitry.

It has also been known from the prior art to use electromechanical plotters or ink jet technology to apply ink in a nonimpact fashion to a medium to form images thereon. The electromechanical plotter technology is very speed limited. The ink jet technology relies on controllably applying a stream of ink to a medium and exhibits the disadvantage of being a wet process. Further, the ink jet technology is limited by the speed at which a jet can apply particles of ink to a medium.

There is therefore a need in the art for a light-weight, essentially silent image creation system that can inexpensively create high quality images. There is further a need in the art for a light-weight, essentially silent image creation system which can also create multiple copies of an image without the need for an intermediate or original copy.

SUMMARY OF THE INVENTION

The invention provides for a display system having a source of radiant energy, an energy sensitive medium, means for displaying an image and means for providing an electrical control signal connected to the means for displaying an image with the means for displaying an image adapted to display an image in response to the electrical control signal and further adapted to control the spatial impingement of radiant energy generated by the source of radiant energy onto the energy sensitive medium whereby an image corresponding to the image displayed on said means for displaying an image is formed on the energy sensitive medium.

An embodiment of the invention includes a transmissive liquid crystal display positioned between a light sensitive medium such as a tellurium imaging film or paper coated with tellurium imaging material and a light source. The liquid crystal display acts as a passive valve or mask which is electronically controlled from a keyboard or other source of electrical signals. The image formed on the display in response to the electrical signals, determines which regions of the film or coated paper will be exposed by radiant energy from the source of light. The image is permanently formed on the film or coated paper. A transport mechanism adapted to move the film or coated paper permits a liquid crystal display that displays only a line of characters at a time or a raster line display that displays only a single raster line at a time to be used to generate a larger image.

An alternate embodiment of the invention includes either a transmissive or a reflective liquid crystal display which is electronically controlled. The display can be used to control the impingement of radiant energy upon a photosensitive drum such as used in a standard xerographic reproduction process.

The invention also provides for a method of forming a permanent image in an energy sensitive medium comprising the steps of: providing a selected electrical signal corresponding to the image to be formed, sensing the electrical signal and forming a spatial representation thereof, modulating radiant energy from a source of energy by means of the formed spectral representation of the image, and exposing a region of the energy sensitive medium with the modulated radiant energy to form the image permanently thereon.

DETAILED DESCRIPTION OF THE PREFERRED EMBODIMENTS

Figure 1:
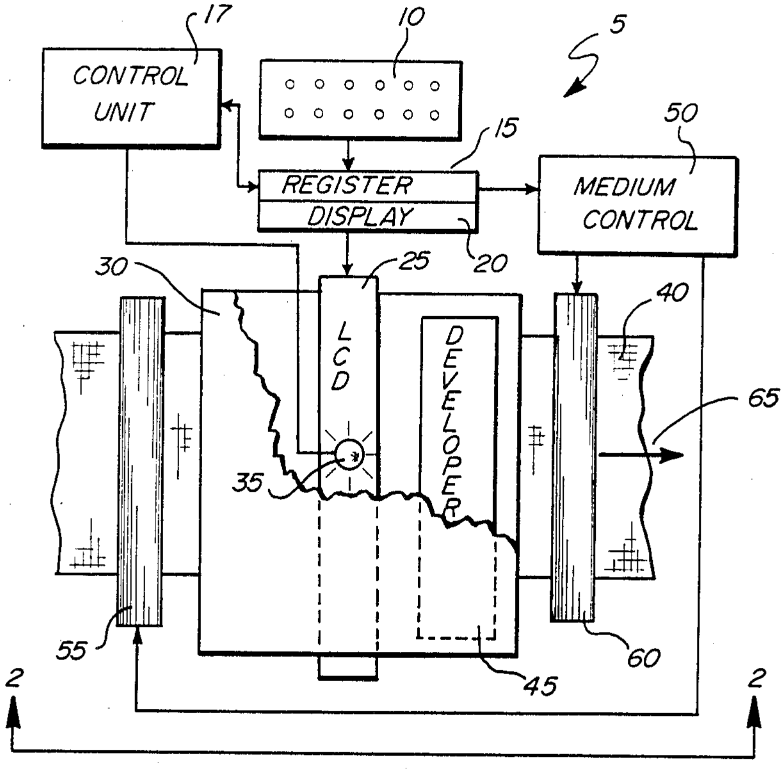
FIG. 1 is a block diagram of one embodiment of the present invention showing in a planar partly broken away top view the relative positions of selected physical components.

With respect to the figures, FIG. 1 discloses a block diagram 5 of an embodiment of the present invention. The imaging system of block diagram 5 includes a keyboard 10 connected a register 15 having a display unit 20 attached thereto. Keyboard 10 is a standard electronic or electromechanical typewriter-like keyboard which when a key thereon is depressed causes a character code to be loaded into register 15. The display unit 20 displays the last line of characters that have been entered using the keyboard 10. The register unit 15 generates electrical signals corresponding to the stored characters and these signals are connected to a liquid crystal display 25. The liquid crystal display 25 is of the transmissive type and is adapted to display a line of perhaps eighty alphanumeric characters with each character being formed of a selected matrix size such as 9×12. The display 25 displays the characters whose codes have been loaded into the register unit 15.

The liquid crystal display 25 is positioned in a housing 30 along with a source of illumination or energy 35 positioned above the liquid crystal display 25. Liquid crystal displays of a suitable type are known in the art and such displays are disclosed, for example, in U.S. patent application Ser. No. 573,004 filed Jan. 23, 1984 and entitled Liquid Crystal Displays Operated by Amorphous Silicon Alloy Diodes, assigned to the assignee of the present application Ser. No. 573,004 is incorporated herein by reference. The display 25 is positioned between the source of energy 35 and an energy sensitive medium 40. The energy sensitive medium 40 can be a selected film or coated paper.

The display 20 can be electrically connected to the register 15 such that the display 20 will display the line of characters loaded into the register 15 by means of the keyboard 10. The display unit 20 alternately can be optically connected to the liquid crystal display 25 and provide a way for an operator to directly view the image on the liquid crystal display 25.

Since the display 25 is of the transmissive type, each of the displayed characters is displayed transparently so that energy from the source 35 passes through the displayed character and falls upon the medium 40. The medium 40 may be any variety of energy sensitive film adapted for use with the source of energy 35. In the block diagram 5 of FIG. 1, the liquid crystal display 25 functions as an electrically controlled mask positioned between the source of energy 35 and the energy sensitive medium 40. The liquid crystal display 25 by means of the image formed therein in response to the electrical signals from the register 15 controls the spatial impingement of energy generated by the source 35 onto the medium 40. The liquid crystal display 25 thus acts as a spatial modulator of the radiant energy generated by the source 35. The control unit 17 causes the source of energy 35 to flash or generate bursts of energy in synchronism with the entry of a line of characters from the keyboard 10 into the register 15. The source of energy 35 might generate visible light or some other selected form of radiant energy.

One type of film usable as the medium 40 is a class of tellurium based imaging films. Energy sensitive tellurium based films are disclosed in the prior art. Such films are disclosed, for example, in U.S. Pat. No. 4,340,662, issued July 20, 1982, U.S. Pat. No. 4,066,460, issued Jan. 3, 1978 and also in pending U.S. patent applications Ser. No. 392,586 filed June 28, 1982 as well as Ser. No. 392,576 filed June 28, 1982. Both of said patent applications being assigned to the assignee of the present application. The disclosures of said two patent applications and said two issued patents are incorporated herein by reference.

Tellurium based films of the type disclosed in the '460 and the '662 patents may be developed after exposure to radiant energy such as light by the application of heat. A heat generating developer 45 also positioned in the housing 30 and can be used to develop the exposed portions of the film 40. A medium control unit 50 connected through the register unit 15 to the control unit 17 can be used to actuate a pair of medium moving rollers 55, 60. The medium control unit 50 moves the film 40 a line of characters at a time in the direction of an arrow 65 once each line of characters has been exposed through the display 25 in combination with the source of energy or illumination 35.

While the liquid crystal display 25 has been described in terms of a character line at a time display, it will also be understood to those skilled in the art that the liquid crystal display 25 could be implemented as a raster line display with one or more raster lines with as many pixels along each line as desired. For example, pixel sizes on the order of 1 to 10 microns are possible in current liquid crystal displays. In such an implementation, one or more raster lines may be displayed by setting a plurality of control bits in a register corresponding to the register 15. Alphanumeric characters or any other image could then be created by repeatedly setting the raster line display by means of a control register and then exposing the film 40 by means of the source of illumination 35.

As an alternate to the tellurium based films referred to previously, dispersion imaging films might be used. Such films are known in the art and disclosed in U.S. Pat. No. 4,332,880 which issued June 1, 1982 and is assigned to the assignee of the present application. The disclosure of the '880 patent is incorporated herein by reference. Other types of light sensitive films known to those skilled in the art might also be used.

Alternately, instead of a film, a coated paper could be used as the medium 40. In such an embodiment a positive coating could be used on the paper which upon exposure to the source of illumination 35 and then development by the developer 45, develops dark.

It will be understood that while a keyboard 10 is shown in FIG. 1 as the source of the symbols to be displayed, alternate sources could be used. For example, keyboard 10 could be replaced with a connection to a computer or other electronic unit adapted to generate sequences of symbols or images to be displayed.

Figure 2:
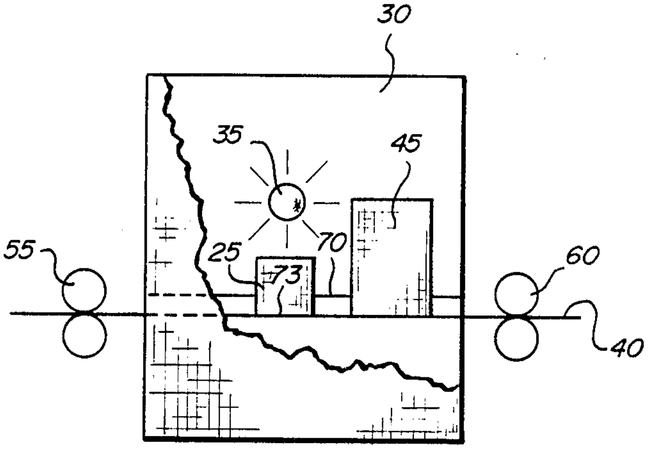
FIG. 2 is a planar partly broken away side view of the relative positions of the physical components of FIG. 1.

FIG. 2 discloses a front planar view of the imaging system of block diagram 5. The same identification numerals are used in FIG. 2 in connection with corresponding components as are used in FIG. 1. As can be seen from FIG. 2, the liquid crystal display 25 is positioned against the film or coated paper 40. A shield 70 blocks the source of energy 35 from the medium 40 except in a region 73 which is exposed by the image formed on the liquid crystal display 25.

Figure 3:
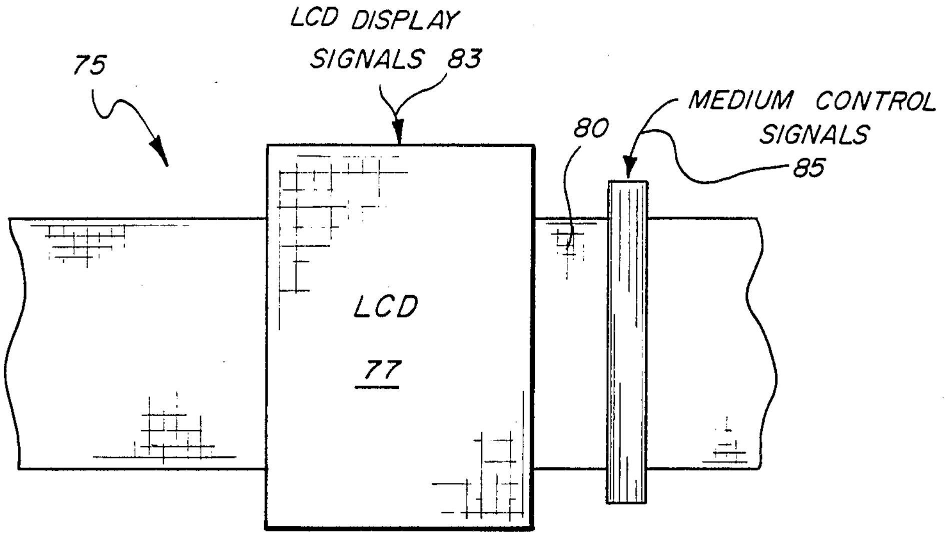
FIG. 3 is a top planar view of a second embodiment of the invention.

FIG. 3 discloses an alternative embodiment of the present invention. In FIG. 3, an imaging system 75 is disclosed having a large area liquid crystal display 77 positioned adjacent a medium member 80. The large area liquid crystal display 77 is adapted to be of the transmissive type and includes a large number of display pixels, perhaps 1024×1024 or larger, arranged in a two-dimensional array so as to display either a portion of an entire image or an entire image at one time. A source of energy is positioned above the liquid crystal display 77 such that the display 77 can act as a mask with respect to the medium 80. A plurality of control signals 83 is indicated in FIG. 3 as setting the display 77. The control signals 83 can be generated electronically, perhaps by a computer, and might correspond to alphanumeric characters or other graphical symbols. The medium control signals 85 could also be generated electronically so as to move the medium 80 in synchronism with the liquid crystal display signals 83.

The imaging system 5 of FIG. 1 or the imaging system 75 of FIG. 3 can create multiple copies of an image without any need to first create an original document having the image formed thereon.

Figure 4:
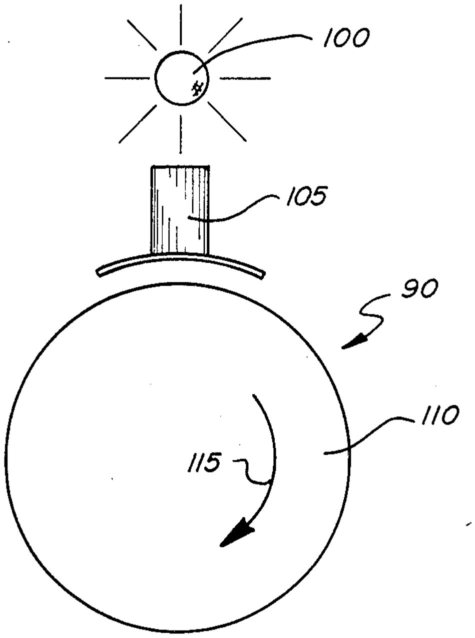
FIG. 4 is a front planar view of a third embodiment of the invention.

Yet another embodiment of the present invention is shown in FIG. 4. A system 90 as disclosed in FIG. 4 includes a source of illumination 100, a liquid crystal display 105 positioned between the source of illumination 100 and a photoresponsive drum 110 such as those used in the xerography process. As the drum 110 rotates in the indicated direction 115 the liquid crystal display 105, either the raster line type or the character line at a time type acts as an electronically controlled mask for the source of illumination 100 so as to form either a display of graphical information or a display of characters or both on the photosensitive drum 110. Once the display is formed on the drum 110 the xerographic process is completed in a standard fashion. As a result, the system of FIG. 4 is adapted for use with plain papers as is any other xerographic process.

Figure 5:
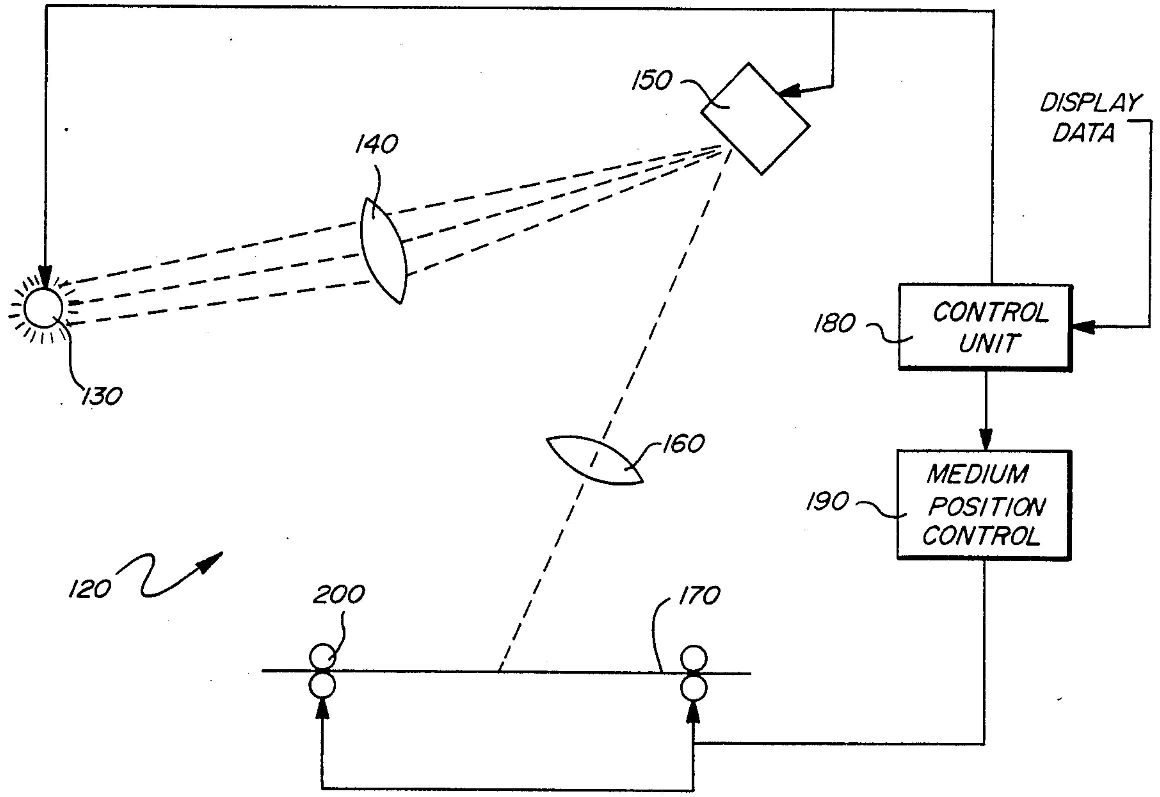
FIG. 5 is a block diagram of yet another embodiment of the invention.

FIG. 5 discloses yet another embodiment of the invention. In FIG. 5, a system 120 includes a source of energy or illumination 130, a focusing system indicated schematically at 140, a liquid crystal display 150, a second focusing mechanism indicated schematically at 160 an energy or light sensitive medium 170, a control unit 180, a medium position control 190 and a medium movement mechanism 200.

In the system 120 of FIG. 5, the liquid crystal display 150 is of the reflective type. Light generated by the source 130 and focused through the focusing mechanism 140 reflects off of the display set in the liquid crystal display 150. The reflected light passes through the focusing mechanism 160 and falls upon the energy or light sensitive medium 170. The control unit 180 in response to display data provided thereto creates the electrical signals necessary to generate the image on the liquid crystal display 150. The display 150 might be a raster line display or alternately could be a character line display. The control unit 180 is electrically connected to the medium position control 190 so as to be able to move the medium 170 during the process of creating the desired image.

The energy or light sensitive medium 170 could be a tellurium imaging film, a paper coated with a tellurium imaging material, or any other energy or light sensitive medium.

While various modifications and changes might be proposed by those skilled in the art, it will be understood that the broader aspects of the invention include all variety of light or energy sensitive films, light or energy sensitive coated papers or variations on the type or characteristics of the liquid crystal displays.

We claim:

1. A system for creating images comprising:

a source of energy;

input means for generating electrical control signals;

means for displaying an image, said means for displaying an image being connected to said input means for generating electrical control signals and adapted to display an image in response to said electrical control signals;

an energy sensitive medium adapted to display thereon an image generated by said means for displaying an image and comprising a selected tellurium based imaging material deposited on a substrate; and said means for displaying an image being disposed between said source of energy and the energy sensitive medium so as to control the spatial impingement of energy from said source of energy onto the energy sensitive medium.

2. The system of claim 1 wherein said means for forming an image comprises liquid crystal means for forming an image.

3. The system of claim 2 wherein said liquid crystal means for forming an image comprises transmissive liquid crystal means for forming an image.

4. The system according to claim 3 wherein said transmissive liquid crystal means for forming an image comprises a transmissive liquid crystal display adapted to display at least one selected character.

5. The system according to claim 3 wherein said transissive liquid crystal means for forming an image comprises a transmissive liquid crystal display adapted to display at least one raster line of a selected length.

6. The system according to claim 3 wherein said transmissive liquid crystal means for forming an image comprises a large area liquid crystal display adapted to simultaneously display a selected number of pixels arranged in a two-dimensional array thereby forming at least a part of a selected image.

7. The system according to claim 3 further including means for moving said energy sensitive medium.

8. The system of claim 2 wherein said source of energy comprises a source of visible light.

9. The system of claim 1 wherein said tellurium based imaging material is deposited on a substrate of paper.

10. An image generating system for generating images on an energy sensitive medium comprising a source of radiant energy, means for displaying at least a portion of an image and means for signal generation connected to said means for displaying at least a portion of an image whereby said means for displaying at least a portion of an image is adapted to display at least a part of an image in response to an electrical signal generated by said means for signal generation and whereby said displayed part of the image forms a mask to spatially modulate the impingement of radiant energy generated by the source of radiant energy on the energy sensitive medium to form that part of the image permanently thereon, said energy sensitive medium comprising a selected energy sensitive sheet member including a tellurium based image forming material deposited on a substrate adapted to display thereon an image formed by said means for displaying an image.

11. The system of claim 10 wherein said means for displaying at least a portion of an image comprises liquid crystal means for forming a display.

12. The system of claim 11 wherein said liquid crystal means for forming a display comprises transmissive liquid crystal means for forming a display.

13. The system according to claim 12 wherein said transmissive liquid crystal means for forming a display comprises a transmissive liquid crystal display interposed between the energy sensitive medium and the source of illumination.

14. The system according to claim 12 wherein said transmissive liquid crystal means for forming a display comprises a transmissive liquid crystal display adapted to display at least one raster line of a selected length with said means for forming a display being interposed between the energy sensitive medium and the source of illumination.

15. The system according to claim 12 wherein said transmissive liquid crystal means for forming a display comprises a large area liquid crystal display adapted to simultaneously display a selected number of pixels arranged in a two-dimensional array and adapted to form at least a part of a selected image.

16. The system of claim 11 wherein said liquid crystal means for forming a display comprises reflective liquid crystal means for forming a display.

17. The system according to claim 16 including further, means for directing radiant energy reflected off of said reflective liquid crystal means for forming a display onto the energy sensitive medium.

18. The system of claim 10 wherein said tellurium based image forming material is deposited on a substrate of paper.

19. An image generating system comprising:

a source of radiant energy;

liquid crystal display means;

an energy sensitive medium including a light sensitive tellurium based imaging material deposited on a substrate; and means for control connected to said liquid crystal display means, said means for control being adapted to provide a selected electrical signal to said liquid crystal display means, said liquid crystal display means being adapted to form an image in response to said electrical signal and to thereby modulate radiant energy generated by said source of radiant energy such that said modulated radiant energy will impinge only on selected regions of the energy sensitive medium to form the image permanently thereon.

20. The image generating system according to claim 19 wherein said means for control includes manually operable means for generating electronic signals to be supplied to said liquid crystal display means.

21. The image generating system according to claim 20 wherein said manually operable means includes at least one manually operable member thereon adapted to generate at least a selected electronic signal in response to operation thereof.

22. The image generating system according to claim 19 wherein said means for control is adapted to be connected to another selected source of electronic signals and the selected electrical signal is generated in part in response to electronic signals from the other selected source.

23. A display system for generating images on a light sensitive medium comprising a source of light, means for generating an electrical signal, a light sensitive medium comprising a selected light sensitive sheet member including a light sensitive tellurium based imaging material deposited on a substrate, and transmissive means for forming a display connected to said means for generating an electrical signal said transmissive means for forming a display being adapted to form an image in response to the electrical signal and further adapted to control the spatial impingement of light from the source of light onto the light sensitive medium whereby a permanent image is formed on the light sensitive medium corresponding to the image formed on said transmissive means for forming a display.

24. The system of claim 23 wherein said transmissive means for forming a display comprises transmissive liquid crystal means for forming a display.

25. The system according to claim 24 wherein said transmissive liquid crystal means for forming a display comprises a transmissive liquid crystal display adapted to display at least one selected character with said display being interposed between the light sensitive medium and the source of illumination.

26. The system according to claim 25 wherein said transmissive liquid crystal means for forming a display comprises a transmissive liquid crystal display adapted to display at least one raster line of a selected length with said display being interposed between the light sensitive medium and the source of illumination.

27. The system according to claim 24 wherein said transmissive liquid crystal means for forming a display comprises a large area liquid crystal display adapted to simultaneously display a selected number of pixels arranged in a two-dimensional array thereby forming at least a part of a selected image.

28. The system of claim 23 wherein said tellurium based imaging material is deposited on a substrate of paper.

29. A system for creating images comprising:

a source of energy;

means for forming a mask;

an energy sensitive medium comprising a selected energy sensitive sheet member adapted to display thereon an image generated by said means for forming a mask, said energy sensitive sheet member including a selected tellurium based imaging material deposited on a substrate; and means for generating control signals connected to said means for forming a mask whereby said means for forming a mask is adpated to form a spatial representation of an image in response to said control signals thereby to control the spatial impingement of energy from said source of energy onto the energy sensitive medium.

30. The system according to claim 29 wherein said means for forming a mask comprises liquid crystal means for forming an image.

31. The system according to claim 30 wherein said liquid crystal means for forming an image comprises transmissive liquid crystal means for forming an image.

32. The system according to claim 31 wherein said transmissive liquid crystal means for forming an image is disposed between said source of energy and the energy sensitive medium.

33. The system according to claim 31 wherein said transmissive liquid crystal means for forming an image comprises a transmissive liquid crystal display adapted to display at least one selected character.

34. The system according to claim 31 wherein said transmissive liquid crystal means for forming an image comprises a transmissive liquid crystal display adapted to display at least one raster line of a selected length.

35. The system according to claim 31 wherein said transmissive liquid crystal means for forming an image comprises a large area liquid crystal display adapted to simultaneously display a selected number of pixels arranged in a two-dimensional array thereby forming at least a part of a selected image.

36. The system according to claim 30 wherein said liquid crystal means for forming an image comprises reflective liquid crystal means for forming an image.

37. The system according to claim 29 wherein said means for forming a mask is positioned in the optical path between said source of energy and the energy sensitive medium.

38. The system of claim 29 wherein said source of energy comprises a source of visible light.

39. The system of claim 29 wherein said tellurium based imaging material is deposited on a substrate of paper.

40. The system according to claim 29 further including means for moving said energy sensitive medium.

* * * * *